US012799995B2

(12) United States Patent
Shahin

(10) Patent No.: US 12,799,995 B2
(45) Date of Patent: Nov. 17, 2026

(54) CALIPER BRAKE

(71) Applicant: HL MANDO CORPORATION, Pyeongtaek (KR)

(72) Inventor: Hatem Shahin, Pfaffenhofen (DE)

(73) Assignee: HL Mando Corporation, Pyeongtaek (KR)

( * ) Notice: Subject to any disclaimer, the term of this patent is extended or adjusted under 35 U.S.C. 154(b) by 348 days.

(21) Appl. No.: 18/607,579

(22) Filed: Mar. 18, 2024

(65) Prior Publication Data

US 2025/0075757 A1 Mar. 6, 2025

(30) Foreign Application Priority Data

Aug. 28, 2023 (DE) ......................... 102023123078.6

(51) Int. Cl.
*F16D 65/00* (2006.01)
*F16D 55/2265* (2006.01)
*F16D 55/00* (2006.01)

(52) U.S. Cl.
CPC ... *F16D 65/0068* (2013.01); *F16D 55/22655* (2013.01); *F16D 65/0087* (2013.01); *F16D 2055/0016* (2013.01)

(58) Field of Classification Search
CPC ............. F16D 65/0068; F16D 65/0087; F16D 55/22655; F16D 2055/0016
USPC ........................................... 188/73.44, 73.45
See application file for complete search history.

(56) References Cited

U.S. PATENT DOCUMENTS

| | | | | |
|---|---|---|---|---|
| 4,060,154 A * | 11/1977 | Smith | F16D 55/2265 | 188/73.38 |
| 4,162,721 A * | 7/1979 | Moriya | F16D 65/0977 | 188/73.1 |
| 4,265,340 A * | 5/1981 | Scott | F16D 55/227 | 188/73.44 |
| 4,436,186 A * | 3/1984 | Ritsema | F16D 65/54 | 188/196 P |
| 4,537,288 A * | 8/1985 | Stoka | F16D 65/54 | 188/196 P |
| 4,865,161 A * | 9/1989 | Schneider | F16D 55/22655 | 188/196 P |
| 10,253,835 B2 * | 4/2019 | Wagner | F16D 65/095 | |
| 2008/0029356 A1 | 2/2008 | Halasy-Wimmer | | |

FOREIGN PATENT DOCUMENTS

| | | |
|---|---|---|
| CN | 1075176 C | 11/2001 |
| KR | 10-0845922 B1 | 7/2008 |

* cited by examiner

*Primary Examiner* — Christopher P Schwartz
(74) *Attorney, Agent, or Firm* — Harvest IP Law, LLP

(57) ABSTRACT

The caliper brake includes: a carrier fixed to a vehicle body, wherein a guide hole is formed in the carrier; a caliper housing movably installed in the carrier; a guide pin of which an end penetrates the caliper housing and is inserted in the guide hole to guide a movement of the caliper housing; a bush positioned between the guide hole and the guide pin and surrounding at least one portion of the guide pin; and a spring inserted in the bush.

11 Claims, 8 Drawing Sheets

CALIPER BRAKE

CROSS-REFERENCE TO RELATED APPLICATION

This application claims the benefit of German Patent Application No. 102023123078.6, filed on Aug. 29, 2023 in the German Patent Office (DPMA), the disclosures of which are incorporated herein by reference in its entirety.

BACKGROUND

1. Technical Field

The disclosure relates to a caliper brake, and more particularly, to a caliper brake for reducing noise by minimizing deflection of a guide pin.

2. Description of the Related Art

Brake systems for brake are essential to vehicles. A caliper brake is one of such brake systems, and the caliper brake generates a braking force by using friction between a disc and brake pads.

The caliper brake generally includes a caliper housing including a pressing member, a carrier including a pair of brake pads, and a guide pin penetrating the caliper housing to be inserted in a guide hole of the carrier. When the caliper brake performs braking, the pressing member of the caliper housing presses the brake pads, the caliper housing slides on the carrier through the guide pin, and the pair of brake pads is compressed to the disc rotating, sequentially, thereby stopping the disc.

At this time, while the disc rotating in one direction is pressed by the brake pads, toque is generated by a repulsive force against the rotation in the pressing member. The torque is transferred to the caliper housing, and as a result, the guide pin fixed to the caliper housing is inclined inside the guide hole.

As such, a phenomenon in which the guide pin is deflected inside the guide hole provided in the carrier and pressed to the side surface of the guide hole is called a clocking phenomenon. When the guide pin is clocked in the caliper brake, the brake makes noise, and furthermore, the durability of the guide pin and the braking force of the brake deteriorate.

Accordingly, there is a demand for a method for preventing deflection of a guide pin in a caliper brake.

SUMMARY

It is an embodiment of the disclosure to provide a caliper brake for preventing deflection of a guide pin upon braking of the brake.

It is an embodiment of the disclosure to provide a caliper brake for preventing deflection of a guide pin three-dimensionally in all directions upon braking of the brake.

It is an embodiment of the disclosure to provide a caliper brake for preventing deflection of a guide pin upon braking of the brake to reduce noise of the brake.

It is an embodiment of the disclosure to provide a caliper brake for preventing deflection of a guide pin upon braking of the brake to improve durability of the guide pin.

It is an embodiment of the disclosure to provide a caliper brake for preventing deflection of a guide pin upon braking of the brake to improve braking performance of the brake.

It is an embodiment of the disclosure to provide a caliper brake for reducing production cost and improving marketability by preventing a problem that is generated upon braking of the brake through a simple structure.

Additional aspects of the disclosure will be set forth in part in the description which follows and, in part, will be obvious from the description, or may be learned by practice of the disclosure.

In accordance with an aspect of the disclosure, a caliper brake includes: a carrier fixed to a vehicle body, wherein a guide hole is formed in the carrier; a caliper housing movably installed in the carrier; a guide pin of which an end penetrates the caliper housing and is inserted in the guide hole to guide a movement of the caliper housing; a bush positioned between the guide hole and the guide pin and surrounding at least one portion of the guide pin; and a spring inserted in the bush.

The spring may be a coil spring of which a diameter is greater than a diameter of an inner circumferential surface of the bush and smaller than a diameter of an outer circumferential surface of the bush.

The bush may include: a body portion of which cross sectional areas are constant with respect to an axial direction and a tapered portion of which cross sectional areas are reduced with respect to the axial direction.

In the bush, the body portion and the tapered portion may be respectively made of materials having different coefficients of elasticity.

The bush may include an adhesive portion configured to bond the body portion to the tapered portion.

The tapered portion may be provided alongside of the body portion and positioned adjacent to an end of the guide pin inserted in the guide hole.

The spring may be a leaf spring having a cylindrical shape of which a diameter is greater than the diameter of the inner circumferential surface of the bush and smaller than the diameter of the outer circumferential surface of the bush.

The guide hole may include a receiving opening depressed from an inner circumferential surface of the guide hole toward an outer circumferential surface of the guide hole and configured to receive and support the bush.

The bush may include a plurality of bushes spaced apart from each other.

A diameter of the bush may be smaller at a part of the bush, being closer to an end of the guide pin inserted in the guide hole.

The spring may include a plurality of springs respectively inserted into the plurality of bushes, and the plurality of springs may be provided with a smaller coefficient of elasticity at a location closer to an end of the guide pin inserted into the guide hole.

A length of the spring may be shorter than a length of the bush.

The spring may include: a first leaf spring having a cylindrical shape of which a diameter is greater than the diameter of the inner circumferential surface of the bush and smaller than the diameter of the outer circumferential surface of the bush; and a second leaf spring protruding outward from the first leaf spring.

The bush may be made of an elastic material.

The spring may be made of a metal material or a hard rubber material.

The caliper brake may further include a pin boot provided between an entrance of the guide hole and the caliper housing, and the pin boot may be connected to the bush.

The pin boot and the bush may be integrated into one body.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EMBODIMENTS

Figure 1:
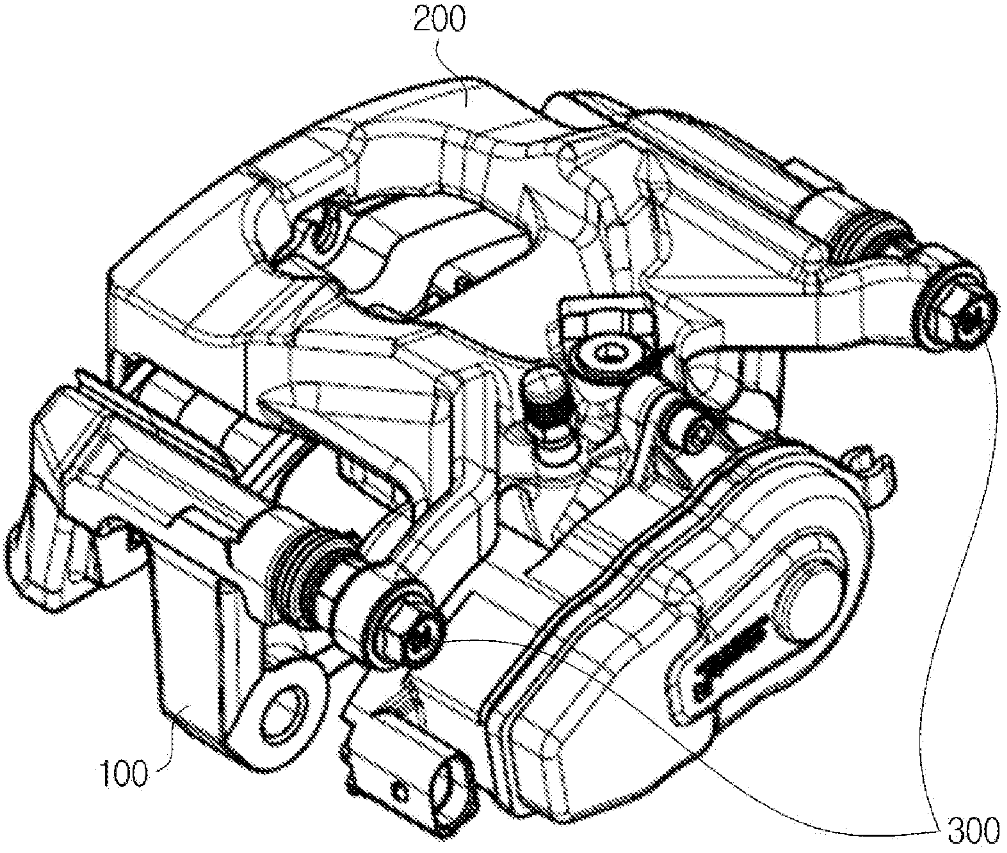
FIG. 1 is a perspective view of a caliper brake according to an embodiment of the disclosure.

Hereinafter, embodiments will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

FIG. 1 is a perspective view of a caliper brake according to an embodiment of the disclosure.

Referring to FIG. 1, a caliper brake according to an embodiment of the disclosure may include a caliper housing 200, a carrier 100, and a guide pin 300.

The carrier 100 may be fixed to a vehicle body and support a brake pad 800 such that the brake pad 800 is movable. A guide hole 110 may be formed in a side portion of the carrier 100 such that the guide pin 300 which will be described below is inserted in the guide hole 110.

The caliper housing 200, which is a component forming an outer frame, may be movably installed in the carrier 100. Generally, the caliper housing 200 may be made of a metal and protect and support the brake pad 800 and the pressing member 700.

The pressing member 700 may press the brake pad 800 toward a disc 900. Generally, the pressing member 700 may operate when a brake pedal is pressed, and generate pressure by using hydraulic pressure or an electromechanical principle. The generated pressure may be transferred to the brake pad 800 and accordingly, the brake pad 800 may be compressed to the disc 900.

The guide pin 300 may guide a movement of the caliper housing 200. More specifically, an end of the guide pin 300 may penetrate the caliper housing 200 and be inserted in the guide hole 110, and thereby, the guide pin 300 may be coupled to the caliper housing 200. Accordingly, the caliper housing 200 may stably move to the disc 900 positioned inside the carrier 100. Generally, two guide pins 300 may be provided and made of a metal or stainless steel.

Figure 2:
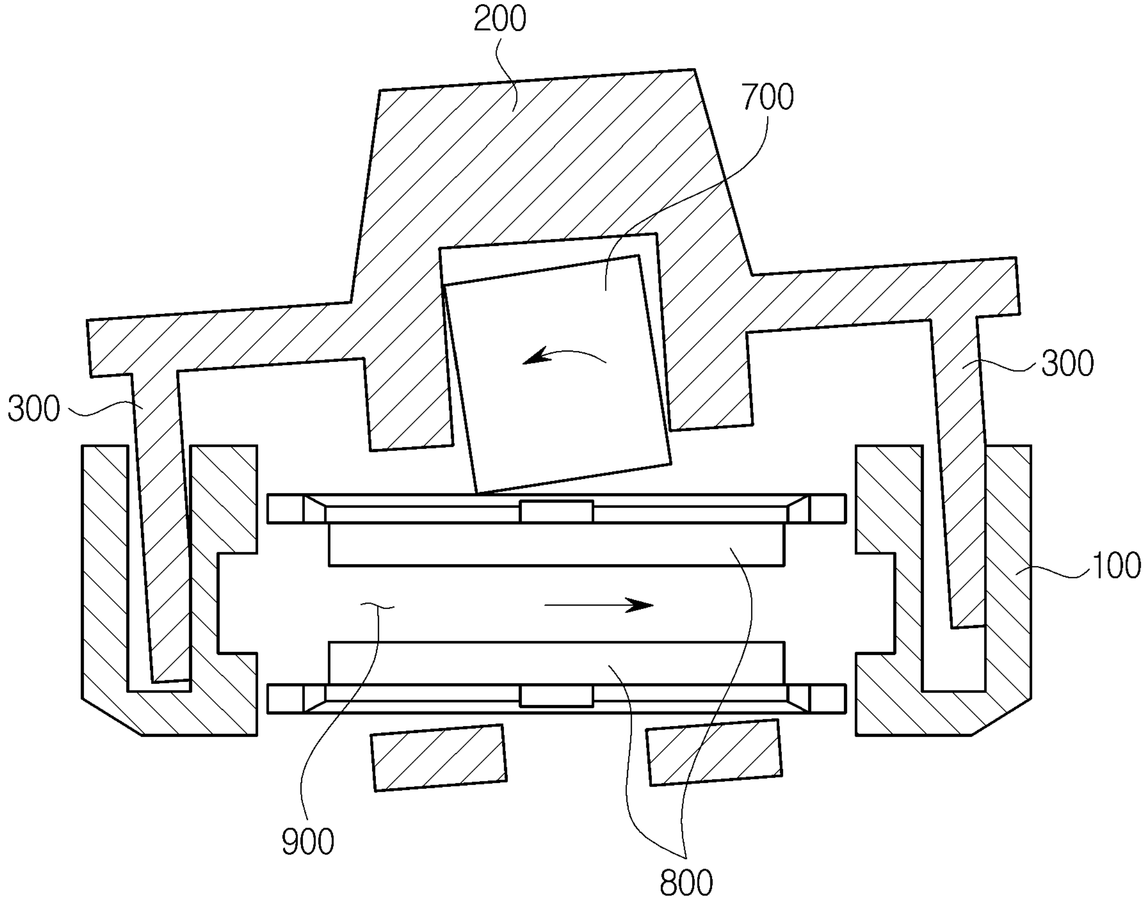
FIG. 2 is a cross-sectional view of an existing caliper brake seen from above.

The disc 900 shown in FIG. 2 may be a component rotating together with a wheel of a vehicle, and a pair of brake pads 800 may be positioned at both sides of the disc 900.

The caliper housing 200, the carrier 100, the guide pin 300, the brake pads 800, and the disc 900, as described above, may be general components of a caliper brake that may be easily implemented by one of ordinary skill in the art based on known technology, and accordingly, detailed descriptions thereof will be omitted.

FIG. 2 is a cross-sectional view of an existing caliper brake seen from above.

Referring to FIG. 2, the existing caliper brake has a problem in which the guide pin 300 is clocked.

More specifically, the pair of brake pads 800 may press the disc 900 rotating in one direction inward from both sides through the pressing member 700. At this time, torque may be generated in the pressing member 700 due to a repulsive force caused by pressing the disc 900 rotating. The torque may be transferred to the caliper housing 200, and as a result, the guide pin 330 fixed to the caliper housing 200 may be inclined inside the guide hole 110.

A phenomenon in which the guide pin 300 is deflected inside the guide hole 110 provided in the carrier 100 and pressed to the side surface of the guide hole 110 is called clocking. As such, due to the clocking of the guide pin 300, the existing caliper brake has made noise of the brake and durability of the guide pin 300 has deteriorated. Also, the deflected caliper housing 200 and the deflected pressing member 700 has failed to compress the brake pad 800 in parallel to the disc 900, which deteriorates a braking force of the brake.

Accordingly, an embodiment of the disclosure may provide a bush 400 including a spring 500 around the guide pin 300 to prevent the clocking phenomenon of the existing guide pin 300.

Figure 3:
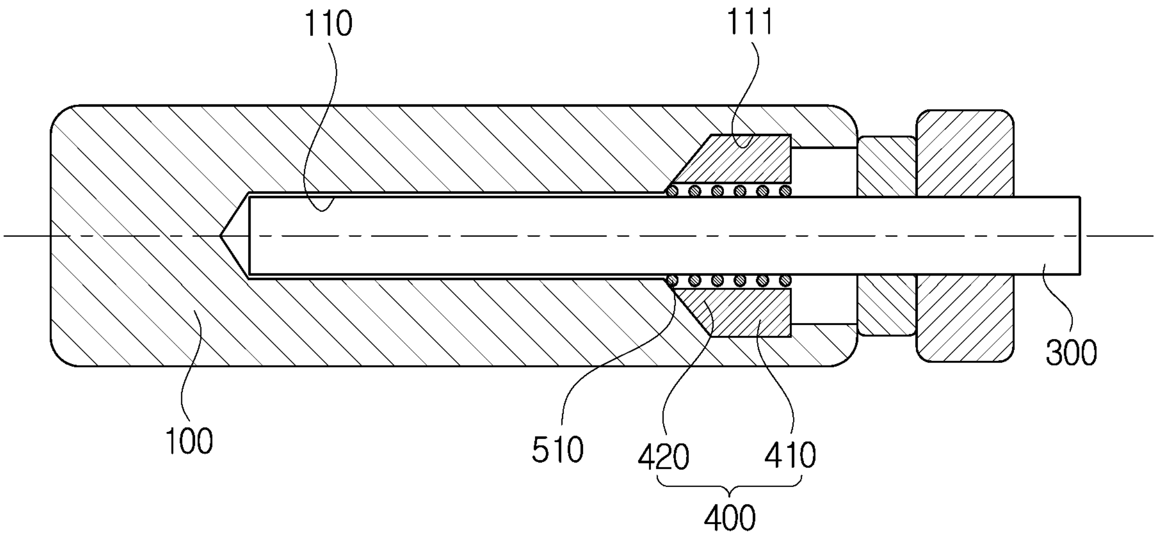
FIG. 3 is a cross-sectional view of a caliper brake according to a first embodiment of the disclosure, seen from the side.
Figure 4:
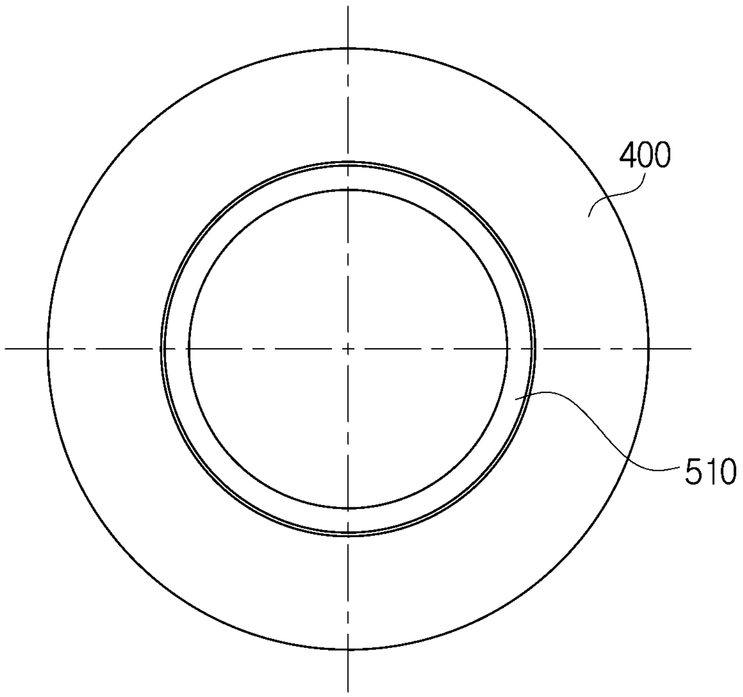
FIG. 4 is a cross-sectional view showing a bush and a spring of the caliper brake according to the first embodiment of the disclosure, seen from the front.
Figure 5:
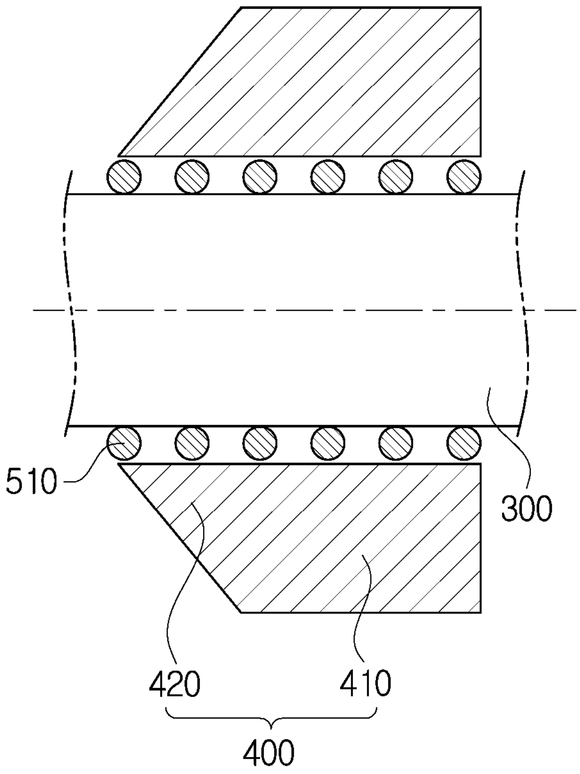
FIG. 5 is an enlarged view showing the bush and the spring of the caliper brake according to the first embodiment of the disclosure, seen from the side.

FIG. 3 is a cross-sectional view of a caliper brake according to a first embodiment of the disclosure, seen from the side, FIG. 4 is a cross-sectional view showing the bush 400 and the spring 500 of the caliper brake according to the first embodiment of the disclosure, seen from the front, and FIG. 5 is an enlarged view showing the bush 400 and the spring 500 of the caliper brake according to the first embodiment of the disclosure, seen from the side.

Referring to FIGS. 3 to 5, the caliper brake according to the first embodiment of the disclosure may include the bush 400 and a coil spring 510.

The bush 400 may surround at least one portion of the guide pin 300 in an axial direction. Accordingly, the bush 400 may reduce a rotation angle of the guide pin 300 that is deflected inside the guide hole 110.

More specifically, the bush 400 according to a first embodiment of the disclosure may have a hollow shape to surround an outer circumferential surface of the guide pin 300 in all directions, as shown in FIG. 4. Accordingly, the bush 400 may prevent deflection of the guide pin 300 three-dimensionally in all directions. The coil spring 510 may be inserted into the inside of the bush 400 to be close to the outer circumferential surface of the guide pin 300. A configuration of the coil spring 510 will be described in detail below.

However, the bush 400 is not limited to a shape having a closed cross section to surround the outer circumferential surface of the guide pin 300 in all directions, and the bush 400 may include another shape capable of preventing deflection of the guide pin 300 in many directions, not in one direction, although the cross section of the shape partially opens.

The bush 400 may include a body portion 410 of which cross sectional areas are constant with respect to the axial direction and a tapered portion 420 of which cross sectional areas are reduced with respect to the axial direction. In this case, the tapered portion 420 may be provided alongside of the body portion 410 and positioned adjacent to an end of the guide pin 300 inserted in the guide hole 110.

More specifically, in the bush 400 according to the first embodiment of the disclosure, the tapered portion 420 may be provided at a front portion (a left side in FIG. 1) of the bush 400, wherein the tapered portion 420 has a smaller cross sectional area at its part closer to a front end of the bush 400, and the body portion 410 may be provided behind the tapered portion 420 (a right side in FIG. 1). When the guide pin 300 is deflected by the clocking phenomenon, the guide pin 300 may be deflected by a longer distance at its part closer to an entrance of the guide hole 110. Accordingly, the bush 400 may efficiently respond to the guide pin 300 that is deflected by different distances according to its parts by including the tapered portion 420.

The bush 400 may be made of an elastic material such as rubber. Accordingly, the bush 400 may reduce a rotation angle of the guide pin 300 that is deflected inside the guide hole 110 and prevent the guide pin 300 from colliding with the guide hole 110.

The body portion 410 and the tapered portion 420 may be made of materials having different coefficients of elasticity. Accordingly, the bush 400 may efficiently respond to the guide pin 300 that is deflected by different distances according to its parts by including the tapered portion 420 having a different coefficient of elasticity from that of the body portion 410.

However, the disclosure is not limited that the body portion 410 and the tapered portion 420 have different coefficients of elasticity, and each of the body portion 410 and the tapered portion 420 may have different coefficients of elasticity according to its parts.

The bush 400 may be positioned between the guide hole 110 and the guide pin 300. The guide hole 110 may include a receiving opening 111 that is depressed from an inner circumferential surface toward an outer circumferential surface to receive and support the bush 400 thereon.

The receiving opening 111 may have a shape corresponding to the shapes of the body portion 410 and the tapered portion 420 of the bush 400. Accordingly, the receiving opening 111 may increase a size of the bush 400 and prevent the bush 400 from being pushed in a front direction inside the guide hole 110.

A plurality of bushes 400 may be provided. In this case, the plurality of bushes 400 may be spaced apart from each other inside the guide hole 110.

Also, the plurality of bushes 400 may have a smaller diameter or a smaller coefficient of elasticity at a location closer to the end of the guide pin 300 inserted in the guide hole 110. Accordingly, the plurality of bushes 400 may efficiently respond to the guide pin 300 that is deflected by different distances according to its parts because the plurality of bushes 400 have different sizes and different coefficients of elasticity according to their locations.

The spring 500 may be inserted in the bush 400. The spring 500 may be made of a metal material or a hard rubber material. Accordingly, the spring 500 may reinforce stiffness and an elastic force of the bush 400, and the spring 500 may itself reduce a rotation angle of the guide pin 300 that is deflected inside the guide hole 110 and prevent the guide pin 300 from colliding with the guide hole 110.

The spring 500 may be the coil spring 510 having a diameter that is greater than a diameter of the inner circumferential surface of the bush 400 and smaller than a diameter of the outer circumferential surface of the bush 400.

More specifically, the spring 500 according to a first embodiment of the disclosure may be the coil spring 510, and a diameter of the coil spring 510 may be closer to the diameter of the inner circumferential surface of the bush 400 than the diameter of the outer circumferential surface of the bush 400 so as to be positioned adjacent to the guide pin 300. Accordingly, the coil spring 510 having relatively great stiffness may additionally buffer and support a movement of the guide pin 300 that is deflected to efficiently improve durability of the bush 400 having relatively small stiffness.

However, the disclosure is not limited that the coil spring 510 has the diameter according to the first embodiment of the disclosure, and the coil spring 510 may be designed with various diameters ranging from the diameter of the inner circumferential surface of the bush 400 to the diameter of the outer circumferential surface of the bush 400 according to a size and a coefficient of elasticity of the coil spring 510.

The spring 500 may have a shorter length than that of the bush 400. Accordingly, a plurality of springs 500 may be inserted into one bush 400. In this case, the plurality of springs 500 may have different coefficients of elasticity.

Figure 6:
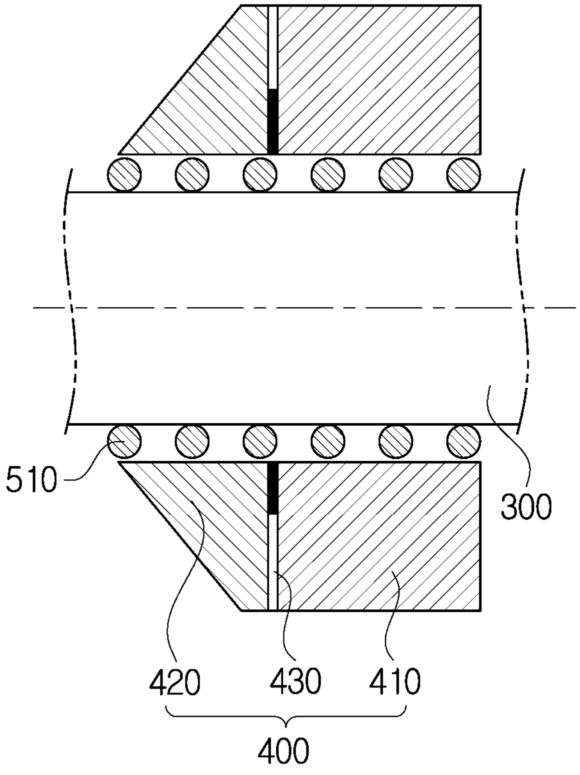
FIG. 6 is an enlarged view showing a bush and a spring of a caliper brake according to a second embodiment of the disclosure, seen from the side.

FIG. 6 is an enlarged view showing a bush 400 and a spring 500 of a caliper brake according to a second embodiment of the disclosure, seen from the side.

Referring to FIG. 6, the caliper brake according to the second embodiment of the disclosure may have a bush 400 dualized, unlike the caliper brake according to the first embodiment of the disclosure.

The following descriptions about the caliper brake according to the second embodiment of the disclosure may be the same as those about the caliper brake according to the first embodiment described above, except for descriptions given with reference to different reference numerals. Accordingly, the same content of the second embodiment as that of the first embodiment will be not described to prevent duplication.

More specifically, in the bush 400 according to the second embodiment, the tapered portion 420 may be separated from the body portion 410. In this case, an adhesive portion 430 for bonding the body portion 410 to the tapered portion 420 may be further provided between the body portion 410 and the tapered portion 420.

A plurality of body portions 410 may be provided, and the plurality of body portions 410 may have different coefficients of elasticity. The adhesive portion 430 may be interposed between the plurality of body portions 410. Accordingly, because the bush 400 is manufactured by separately preparing components having different coefficients of elasticity and then bonding the components to each other, productivity of the bush 400 may be raised.

Figure 7:
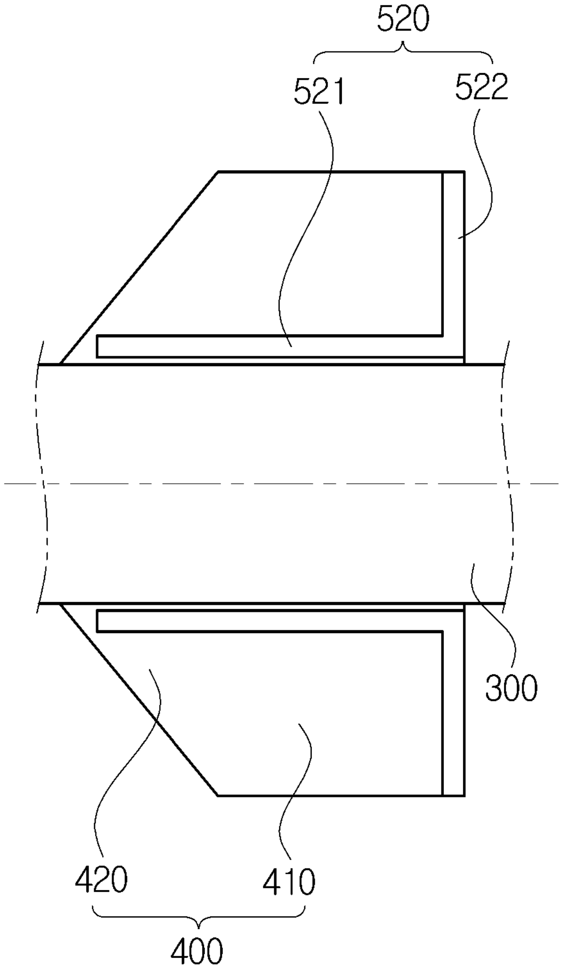
FIG. 7 is an enlarged view showing a bush and a spring of a caliper brake according to a third embodiment of the disclosure, seen from the side.

FIG. 7 is an enlarged view showing a bush 400 and a spring 500 of a caliper brake according to a third embodiment of the disclosure, seen from the side.

Referring to FIG. 7, in the caliper brake according to the third embodiment of the disclosure, the spring 500 may be a leaf spring 500, unlike the caliper brake according to the first embodiment.

The following descriptions about the caliper brake according to the third embodiment of the disclosure may be the same as those about the caliper brake according to the first embodiment described above, except for descriptions given with reference to different reference numerals. Accordingly, the same content of the third embodiment as that of the first embodiment will be not described to prevent duplication.

The spring 500 may be a leaf spring 520 having a cylindrical shape of which a diameter is greater than the diameter of the inner circumferential surface of the bush 400 and smaller than the diameter of the outer circumferential surface of the bush 400.

The leaf spring 520 may include a first leaf spring 521 having a cylindrical shape of which a diameter is greater than the diameter of the inner circumferential surface of the bush 400 and smaller than the diameter of the outer circumferential surface of the bush 400, and a second leaf spring 522 protruding outward from the first leaf spring 521.

More specifically, in the spring 500 according to the third embodiment of the disclosure, the first leaf spring 521 may be adjacent to the guide pin 300 because the diameter of the first leaf spring 521 is closer to the diameter of the inner circumferential surface of the bush 400 than the diameter of the outer circumferential surface of the bush 400, and the second leaf spring 522 may protrude outward from an end of the first leaf spring 521 up to the outer circumferential surface of the bush 400. Accordingly, the first leaf spring 521 having relatively great stiffness may additionally buffer and support a movement of the guide pin 300 that is deflected, and the second leaf spring 522 may directly support the inner circumferential surface of the guide hole 110, thereby efficiently improving the durability of the bush 400 having relatively small stiffness.

However, the diameter of the first leaf spring 521 and the shape of the second leaf spring 522 are not limited to the diameter and shape according to the third embodiment of the disclosure, and the diameter of the first leaf spring 521 and the shape of the second leaf spring 522 may be designed with various diameters ranging from the diameter of the inner circumferential surface of the bush 400 to the diameter of the outer circumferential surface of the bush 400 according to a size and a coefficient of elasticity of the coil spring 510. For example, a plurality of second leaf springs 522 may be provided, and an end of the second leaf springs 522 may protrude between the inner circumferential surface and the outer circumferential surface of the bush 400.

Figure 8:
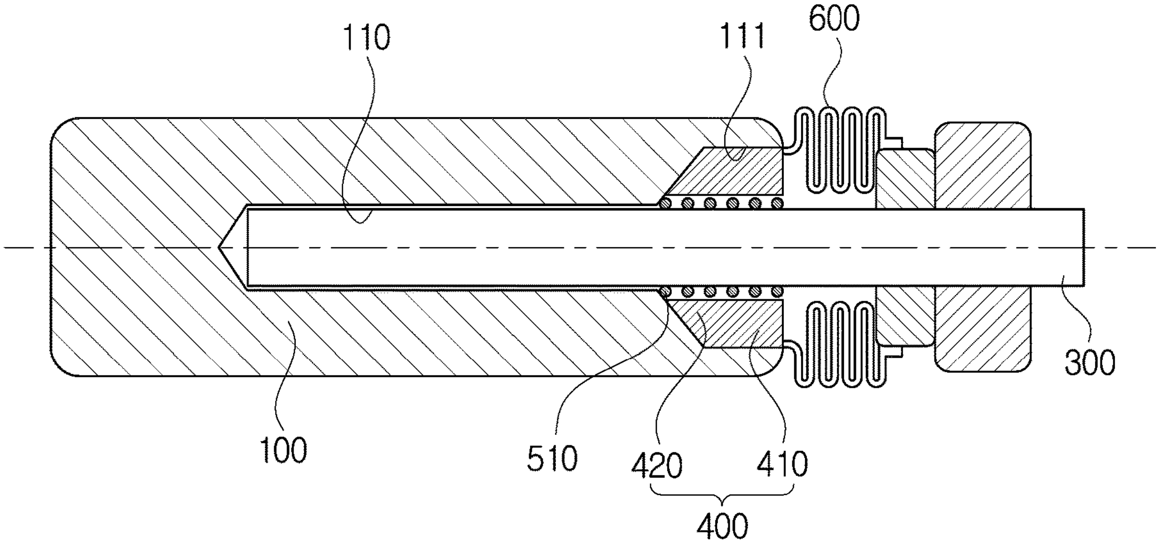
FIG. 8 is a cross-sectional view of a caliper brake according to a fourth embodiment of the disclosure, seen from the side.

FIG. 8 is a cross-sectional view of a caliper brake according to a fourth embodiment of the disclosure, seen from the side.

Referring to FIG. 8, the caliper brake according to the fourth embodiment of the disclosure may include a pin boot 600, unlike the caliper brake according to the first embodiment.

The following descriptions about the caliper brake according to the fourth embodiment of the disclosure may be the same as those about the caliper brake according to the first embodiment described above, except for descriptions given with reference to different reference numerals. Accordingly, the same content of the fourth embodiment as that of the first embodiment will be not described to prevent duplication.

The pin boot 600 may be a component for preventing foreign materials from entering the guide hole 110 when the guide pin 300 slides on the guide hole 110 to be in contact with the guide hole 110. The pin boot 600 may be provided between the entrance of the guide hole 110 and the caliper housing 200 to seal a space between the guide hole 110 and the caliper housing 200 from outside.

The pin boot 600 may be connected to the bush 400. Generally, because the pin boot 600 is made of an elastic material like the bush 400, the pin boot 600 and the bush 400 may be integrated into one body.

More specifically, the pin boot 600 according to the fourth embodiment of the disclosure may be connected to an end of the bush 400 in a rear direction, at an end in the front direction. In this case, the receiving opening 111 may be positioned at an end of the guide hole 110 in the rear direction, and the bush 400 may also be positioned at the end of the guide hole 110. Accordingly, because the bush 400 and the pin boot 600 connected to the bush 400 are easily installed in the carrier 100, the productivity of the brake may be raised.

As such, the caliper brake according to an embodiment of the disclosure may include the bush 400 surrounding the guide pin 300 and the spring 500 inserted in the bush 400 to prevent deflection of the guide pin 300 three-dimensionally in all directions upon braking of the brake, as a result, prevent noise of the brake, improve the durability of the guide pin 300, and improve the braking performance of the brake. The bush 400 and the spring 500 having a simple structure may prevent deflection of the guide pin 300 to reduce production cost of the brake and increase marketability of the vehicle.

An embodiment of the disclosure may provide a caliper brake for preventing deflection of a guide pin upon braking of the brake.

An embodiment of the disclosure may provide a caliper brake for preventing deflection of a guide pin three-dimensionally in all directions upon braking of the brake.

An embodiment of the disclosure may provide a caliper brake for preventing deflection of a guide pin upon braking of the brake to reduce noise of the brake.

An embodiment of the disclosure may provide a caliper brake for preventing deflection of a guide pin upon braking of the brake to improve durability of the guide pin.

An embodiment of the disclosure may provide a caliper brake for preventing deflection of a guide pin upon braking of the brake to improve braking performance of the brake.

An embodiment of the disclosure may provide a caliper brake for preventing a problem that is generated upon braking of the brake, through a simple structure, thereby reducing manufacturing cost of the brake and improving marketability.

What is claimed is:

1. A caliper brake comprising:

a carrier fixed to a vehicle body, wherein a guide hole is formed in the carrier;

a caliper housing movably installed in the carrier;

a guide pin of which an end penetrates the caliper housing and is inserted in the guide hole to guide a movement of the caliper housing;

a bush positioned between the guide hole and the guide pin and surrounding at least one portion of the guide pin; and a spring inserted in the bush, wherein the bush includes:

a body portion of which cross sectional areas are constant with respect to an axial direction, and a tapered portion of which cross sectional areas are reduced with respect to the axial direction, and wherein in the bush, the body portion and the tapered portion are respectively made of materials having different coefficients of elasticity.

2. The caliper brake of claim 1, further comprising a pin boot provided between an entrance of the guide hole and the caliper housing, wherein the pin boot is connected to the bush.

3. The caliper brake of claim 2, wherein the pin boot and the bush are integrated into one body.

4. The caliper brake of claim 1, wherein the spring is a coil spring of which a diameter is smaller than a diameter of an inner circumferential surface of the bush.

5. The caliper brake of claim 1, wherein the bush includes an adhesive portion configured to bond the body portion to the tapered portion.

6. The caliper brake of claim 1, wherein the spring is made of a metal material or a hard rubber material.

7. A caliper brake comprising:

a carrier fixed to a vehicle body, wherein a guide hole is formed in the carrier;

a caliper housing movably installed in the carrier;

a guide pin of which an end penetrates the caliper housing and is inserted in the guide hole to guide a movement of the caliper housing;

a bush positioned between the guide hole and the guide pin and surrounding at least one portion of the guide pin; and a spring inserted in the bush, wherein the spring is a leaf spring having a cylindrical shape of which a diameter is smaller than the diameter of the inner circumferential surface of the bush.

8. The caliper brake of claim 1, wherein the bush includes a plurality of bushes spaced apart from each other.

9. The caliper brake of claim 8, wherein a diameter of the bush is smaller at a part of the bush, being closer to an end of the guide pin inserted in the guide hole.

10. The caliper brake of claim 8, wherein the spring includes a plurality of springs respectively inserted into the plurality of bushes, and the plurality of springs are provided with a smaller coefficient of elasticity at a location closer to an end of the guide pin inserted into the guide hole.

11. The caliper brake of claim 7, wherein the spring includes:

a first leaf spring having a cylindrical shape of which a diameter is greater than the diameter of the inner circumferential surface of the bush and smaller than the diameter of the outer circumferential surface of the bush; and a second leaf spring protruding outward from the first leaf spring.

* * * * *